United States Patent
Guetta

(10) Patent No.: US 9,217,635 B2
(45) Date of Patent: Dec. 22, 2015

(54) THREE DIMENSIONAL MEASUREMENT SYSTEM

(75) Inventor: Avishay Guetta, Rehovot (IL)

(73) Assignee: SHILAT OPTRONICS LTD., Rehovot (IL)

(*) Notice: Subject to any disclaimer, the term of this patent is extended or adjusted under 35 U.S.C. 154(b) by 523 days.

(21) Appl. No.: 13/521,062

(22) PCT Filed: Jan. 9, 2011

(86) PCT No.: PCT/IL2011/000020
§ 371 (c)(1),
(2), (4) Date: Jul. 9, 2012

(87) PCT Pub. No.: WO2011/083476
PCT Pub. Date: Jul. 14, 2011

(65) Prior Publication Data
US 2013/0021595 A1    Jan. 24, 2013

Related U.S. Application Data

(60) Provisional application No. 61/282,245, filed on Jan. 7, 2010.

(51) Int. Cl.
*G01B 11/24* (2006.01)
*G01S 7/491* (2006.01)
*G01S 17/32* (2006.01)
*G01S 17/89* (2006.01)

(52) U.S. Cl.
CPC .............. *G01B 11/24* (2013.01); *G01S 7/4912* (2013.01); *G01S 17/325* (2013.01); *G01S 17/89* (2013.01)

(58) Field of Classification Search
CPC ....... G01S 7/4802; G01S 17/89; G01S 17/58; G01S 7/4811
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,835,199 A * | 11/1998 | Phillips et al. | ............... 356/5.03 |
| 7,012,738 B1 | 3/2006 | Schwarte | |
| 2002/0060784 A1 | 5/2002 | Pack et al. | |
| 2006/0056010 A1 | 3/2006 | Allen | |
| 2006/0262319 A1 * | 11/2006 | Gatt | ............................. 356/492 |

OTHER PUBLICATIONS

PCT Int'l Search Report and Written Opinion of the ISA, mailed Jun. 14, 2011 in PCT/IL11/00020.

* cited by examiner

*Primary Examiner* — Luke Ratcliffe
(74) *Attorney, Agent, or Firm* — Daniel J. Swirsky; AlphaPatent Associates Ltd.

(57) ABSTRACT

A system for making distance measurements of remote points using a phenomenon related to the time of flight of an illuminating beam. A modulated beam of light is directed at the target area. The modulated beam has temporally varying information impressed upon it, such that the time of flight of the beam to the target and back can be related to the temporal signature of the received beam. An acousto-optic modulator is used to perform frequency conversion of the modulated light reflected from points in the field, before that light impinges on the pixels of a detector array. The AO modulation frequency is close to the illuminating light modulation frequency, so that the converted mixed frequency falls within the limited parallel reading rate range of the detector array, and contains the temporal signature information of the modulated light received from the target within signals of manageable frequencies.

21 Claims, 3 Drawing Sheets

TRANSMITTED WAVE

RECEIVED WAVE

PHASE SHIFT

TRANSMITTED WAVE

RECEIVED WAVE

PHASE SHIFT

THREE DIMENSIONAL MEASUREMENT SYSTEM

CROSS-REFERENCE TO RELATED APPLICATIONS

The current application is a U.S. National Phase Application under 35 U.S.C. 371 of PCT International Application No. PCT/IL2011/000020, which has an international filing date of Jan. 9, 2011, and which claims the benefit of priority from U.S. Provisional Patent Application No. 61/282,245, filed Jan. 7, 2010, the disclosure of which is incorporated herein by reference in its entirety.

FIELD OF THE INVENTION

The present invention relates to the field of 3 dimensional measurement systems, especially for use in remote terrain mapping.

BACKGROUND OF THE INVENTION

Systems exist for the remote measurement of distance using optical methods. Such systems use methods include time of flight measurements, based on determining the difference in time between transmitting a pulse of light into the field, receiving the reflected wave at a detector, and measuring the time delay between the transmitted and the reflected signal. Knowing the wave propagation velocity, the distance of the target that reflected the light is calculated There are several methods by which this delay time can be measured optically. Firstly, a simple transit time-of-flight measurement can be made for a single pulse transmitted to the target. Other methods are based on methods conventionally used in LIDAR technology. According to one method, the phase, difference is measured between a transmitted repetitive wave, such as a sinusoidal wave, and the wave received by reflection from the target point. The distance is a function of the wavelength of the light and of the phase difference between transmitted and reflected waves. Alternatively, the transmitted light can have a linear frequency chirp applied to it, or be streamed data and the difference in frequency between the transmitted and the received waves provides a measure of the distance from which the light was reflected from the object being ranged. Additionally, there exist methods whereby a predetermined coding scheme is applied to the transmitted light beam, and the transit time determined by the change in the code detected in the received reflected beam.

Such methods are very effective for measurement of the range to a single point remote from the rangefinder. However, the extension of these methods to rangefinding a complete line or even a complete 2-dimensional area involves hardware limitations which makes the conventional methods used for single point rangefinding difficult to apply for area rangefinding, which is essentially equivalent to 3-dimensional area mapping. To illustrate the magnitude of this problem, the example of terrain mapping is considered, such as would be performed in aerial mapping. In such a requirement, a surface profile may need to be mapped with an accuracy of several centimeters at a distance of hundreds of meters or more, by a moving aerial platform.

The direct frequencies of the optical spectrum involve very short wavelengths and very high frequencies, measurements which are complex and slow, such that ranging measurements are almost never made at the carrier optical frequencies. A common practice is to amplitude modulate the optical wave at a more manageable frequency, in order to lengthen the effective wavelength of the detection envelope and to lower the frequencies to be measured. Using the phase delay measurement method as an example, if the system is capable of making a phase measurement with an accuracy of $\frac{1}{100}$ cycle, and it is required to make a distance measurement with an accuracy of 0.5 cm (i.e. 1 cm for the round-trip distance), the effective wavelength required will be 1 m, corresponding to an effective frequency of the amplitude modulated wave of 300 MHz. The amplitude modulation of the transmitted wave can be performed electrically in the laser source itself, or opto-electrically by means of a modulator at the output of the laser source in the transmitted optical path. Such a frequency range is readily measureable for individual pixel measurements, but becomes much more difficult when a detector array must be read, involving multi-measurements of large numbers of pixels in parallel. Signal detection and processing techniques currently available would have difficulty in performing such a task at acceptable real time speeds on a large imaging line or array. To illustrate the processing speeds required, if it is desired to determine the range to within $\frac{1}{100}$ part of the wavelength of the amplitude modulated wave, then each cycle of the 300 MHZ modulated light needs to be sampled 100 times, leading to a sampling frequency of 30 GHz. When this has to be performed for a large number of parallel pixels, the processing speeds required are enormous, and difficult to achieve currently.

There therefore exists a need for a practical system and method for enabling effective three dimensional mapping in real time with high resolution, which overcomes at least some of the disadvantages of prior art systems and methods.

The disclosures of each of the publications mentioned in this section and in other sections of the specification, are hereby incorporated by reference, each in its entirety.

SUMMARY OF THE INVENTION

The present disclosure describes new exemplary systems for making real time distance measurements of remote points in the field of view with high accuracy. Scanning of these points over the field of view then provides distance measurement over a 2-dimensional area, or essentially, a three dimensional terrain map. The system operates on the principle of measurement of a phenomenon related to the time of flight of an illuminating beam. A modulated beam of light is directed at the target area. The modulated beam has temporally varying information impressed upon it, such that the time of flight of the beam to the target and back to the receiver can be related to the temporal signature of the received beam. This temporally varying information can take any form which enables the point in time of reception of a beam reflected from the target point whose distance it is desired to determine, to be related to the point in time of transmission of the received beam. As mentioned hereinabove in the background section, such a temporal signature can take the form of a modulation phase delay, a frequency shift, a coding scheme change, or a change in any other property impressed on the transmitted beam which enables its time coordinates to be measured downstream.

Since amplitude modulation is a very commonly used and simple form of modulation, the systems and methods described in this application will generally relate to this implementation, though it is to be understood that the systems and methods are not meant to be limited just to such methods of modulation, and are generally applicable to any form of temporal identification of the transmitted and received beam.

For amplitude modulated transmitted light, the phase delay between the light transmitted to a point in the area and the light reflected from that point is a measure of the distance of the point from the transmitter/detector, assuming that both are co-located and bore-sighted. In order to provide high accuracy to the distance measurement, the modulation frequency must be considerably higher than the reading rate of typical detector arrays, especially when taking into account that multiple pixels of the detector array have to be handled simultaneously. Therefore, a method is used of converting the high modulation frequency down to a frequency readable by the detector array electronics, yet without losing the phase information required to determine the distance of each point ranged. A technique similar to heterodyne mixing may be used to reduce the detection frequency to levels which can be handled by the detector array readout electronics.

An exemplary system utilizes an acousto-optic modulator to perform frequency conversion of the modulated light reflected from points in the field, before that light impinges on the detector array. In order that the converted frequency be sufficiently low that it falls within the reading rate range of the detector array, the AO modulation frequency should be close to the illuminating light modulation frequency. A practical terrain scanning application may typically involve an acceptance angle of up to 15°, for instance, to provide a 2 cm lateral resolution using a 4,000 pixel array (representing a field of 80 m) measured from a height of 300 m. Using conventional techniques, an attempt could be made to modulate the whole of this field imaged onto the line detector. However, because of the slow fill up rate of the AO modulator, limited by the comparatively low speed of acoustic propagation within the AO modulator crystal as compared with the speed of optical propagation, it is impossible to modulate the entire length of an AO modulator of sufficient length that it can handle a measurement field of that practical size, at the rate required to provide high accuracy distance measurement. Typically, for commonly used AO materials such as quartz, the acoustic wave will only travel ten or a few tens of microns during the 3.3 nanosecond time scale of one period of the modulating frequency of the optical wave, 300 MHz. Such a short AO modulator could not possibly be used to modulate the light from a large practical field of view imaged onto a line detector, which may need to be a few tens of millimeters in length in order to supply the length resolution required of the mapped area, each pixel being only a few microns in length.

A solution to this problem may be provided by exciting the AO modulator with acoustic energy at two frequencies, whose difference is a frequency close to but not equal to the modulated frequency of the transmitted and reflected light. The difference from the modulated frequency of the transmitted and reflected light is selected to be in a frequency range which the detector array and associated electronics can readily handle for all of the pixels in parallel. Since the AO crystal is a linear device, the result of exciting the AO modulator with acoustic energy at the two frequencies is a superposition of the two frequencies. This generates a travelling grid at the average frequency of the two superpositioned waves moving down the crystal at its characteristic acoustic velocity, on which is impressed an envelope at the difference frequency between the two frequencies. The grid diffracts light falling thereon into the various diffraction orders, and since this diffraction grid travels down the AO modulator, light passing through different points along the modulator are diffracted at different points in time. Therefore looking at any point in the crystal, the reflected light received from the remote point transmitted through that point sees the high frequency AO interference grid pulsating at the rate of the difference frequency as the modulation envelope of the traveling grid travels down the crystal past that point. The interference between the acoustic wave frequency and the optical modulation frequency thus results in a low frequency modulation, which is the converted frequency, which contains the phase information of the modulated light received from the target.

Each segment of the modulator is imaged onto its corresponding pixel (or pixels) of the detector array. These segments each modulate the modulated reflected light from points in the field, resulting in a received signal at each pixel having a converted frequency which is low enough to be in the reading range of the pixel array, and yet having the phase information providing the distance to be measured, impressed thereon with the accuracy of the high transmitted light modulation frequency. The successive peaks or troughs generated by the low difference frequency envelope of the travelling grid, traverse segment after segment of the AO modulator at the characteristic velocity of the AO wave, preserving the phase information, such that each detector pixel can read the phase difference information derived with the accuracy of the high frequency optical information but at the low frequency rate of the mixed signal after AO modulation. In effect, the AO modulator has been built of a serial array of micro-modulators, each modulating the light passing through at a frequency which enables a high accuracy distance measurement to be made, yet without being limited by the comparatively slow acoustic fill up time of the AO crystal. Each successive pixel is regarded as an independent imaging pixel receiving light modulated by its own associated AO micro-modulator, and is thus read out. The next pixel can read out its information simultaneously at a different phase point of the moving envelope, or it can "wait" till the maximum of the envelope reaches that pixel, a short while later, since the points of time when the modulation is at a maximum are progressively later, moving down the AO modulator crystal at the acoustic velocity with the travelling grid modulation.

In conclusion, this combination of a suitable excited acousto-optic modulator with a line of pixelated detectors enables the following results to be achieved:

(i) Use of a long AO crystal in order to view a large field of view, which in the prior art, was only possible using a low modulating frequency, which could not provide the measurement accuracy required.

(ii) Modulation of the AO crystal at a frequency substantially higher than that required to be able to use the full length of the AO crystal to view a predetermined field of view. This high frequency enables accurate distance measurement to be performed by accurate measurement of the phase delay in the reflected light.

(iii) Imaging of the light traversing the AO crystal onto the pixels of the detector, thereby dividing the AO crystal into segments, each segment being imaged by a different pixel (or pixels) of the detector array, but in which each segment modulates at a high frequency but independently of its neighboring segments.

(iv) Operation of the line sensor at a speed which enables measurement of each successive fluctuating segment.

This implementation has been described using phase detection to determine the range of the measured point, but it is to be understood that a similar arrangement of a travelling grid in the AO modulator can be used for making distance measurements based on any temporally imprinted form of modulation. Thus, the transmitted beam may be frequency chirped, according to which embodiment, instead of measuring the phase differences between the transmitted and the received optical waves, the frequency differences are measured to determine the distance to points in the target field measured by each pixel. Alternatively, the distance measurement may be based on a temporal pulse coding scheme applied to the transmitted light, with the temporal code being received providing an indication of the distance travelled by the light to and from the target point to be measured.

One example implementation involves, a system for remote distance measurement, comprising:

(i) a light source assembly configured to transmit modulated light to a point whose distance is to be measured in the field of view of the system, (ii) a pixelated detector, adapted to receive light reflected from the point and imaged onto a pixel of the detector, the received light having a temporal signature arising from the distance of the point from the system, (iii) an acousto-optic modulator, disposed relative to the pixelated detector, such that the received reflected light passes therethrough before impinging on the pixelated detector, and (iv) a control system adapted to calculate the distance of the point from the temporal signature of the received light, wherein the acousto-optic modulator is excited with a travelling modulating acoustic wave, such that when modulated light received from the point is passed through the acousto-optic modulator, mixing occurs which generates a converted modulated optical wave containing the temporal signature information in a frequency range substantially less than that related to the modulation of the transmitted light.

In such an implementation, the modulation of the light from the source assembly may be generated either within the light source, or by means of an optical modulator external to the light source. Furthermore, the travelling modulating acoustic wave may be generated by inputting a pair of acoustic waves having a difference in waveform, which mix acoustically in the acousto-optic modulator. This acoustic mixing of the pair of acoustic waves may then generate an optically diffracting grid travelling down the acousto-optic modulator.

In any of such exemplary systems, the pixilated detector should be enabled to measure the temporal signature of light received from the point with an accuracy characteristic of the modulation, and at a rate characteristic of the frequency range substantially less than that related to the modulation of the transmitted light. Additionally, the frequency range substantially less than that of the modulation of the transmitted light, should fall within the rate at which the pixels of the detector can be read. This modulation of the transmitted light may be of sufficiently high speed that the distance measurement can be performed with a predetermined accuracy, and that speed may be substantially higher than the rate at which the pixels of the detector can be read in parallel.

Yet other implementations may involve any of the systems described hereinabove, in which each segment of the acousto-optic modulator modulates received light containing information relating to a different point in the field of view. In such a case, light traversing each segment of the acousto-optic modulator should impinge onto an associated pixel in the pixelated detector.

Furthermore, any of such exemplary systems may further comprise a grey level detector, such that the system can combine an image of the field of view together with the distance information. Additionally, in any of the systems, the pixilated detector may advantageously be a line array.

Referring now to the temporal signature aspects of such systems, in any of the described systems, the temporal signature arising from the distance of the point from the system should be a function of the transit time of the light to and from the point.

Furthermore, in such systems, the transmitted light may be amplitude modulated with a predetermined modulation frequency, in which case the temporal signature is the modulation phase delay of the received light relative to the transmitted light.

Alternatively, the transmitted light may be frequency chirped, in which case the temporal signature is the difference in frequency of the received light relative to the transmitted light.

In yet another example, the transmitted light may have a temporal coding scheme applied to it, and the temporal signature in this case is the temporal code of the received light relative to the transmitted light.

Yet other implementations described in this application perform a method for remote distance measurement, comprising the steps of:

(i) transmitting modulated light to a point whose distance is to be measured, (ii) providing a pixelated detector, positioned such that light reflected from the point is imaged onto a pixel of the detector, the received light having a temporal signature by virtue of the distance of the point, (iii) providing an acousto-optic modulator disposed relative to the pixelated detector, such that the received reflected light passes therethrough before impinging on the pixelated detector, (iv) exciting the acousto-optic modulator with a travelling modulating acoustic wave, such that when modulated light received from the point is passed through the acousto-optic modulator, mixing occurs which generates a converted modulated optical wave containing the temporal signature information in a frequency range substantially less than that related to the modulation of the transmitted light, and (v) calculating the distance of the point from the temporal signature of the received light.

In such a method, the modulation of the transmitted light may be generated either within the light source used to transmit the light, or by means of an optical modulator external to the light source. Furthermore, the travelling modulating acoustic wave may be generated by inputting a pair of acoustic waves having a difference in waveform, which mix acoustically in the acousto-optic modulator. This acoustic mixing of the pair of acoustic waves may then generate an optically diffracting grid travelling down the acousto-optic modulator.

In any of such exemplary methods, the pixilated detector should be enabled to measure the temporal signature of light received from the point with an accuracy characteristic of the modulation, and at a rate characteristic of the frequency range substantially less than that related to the modulation of the transmitted light. Additionally, the frequency range substantially less than that of the modulation of the transmitted light, should fall within the rate at which the pixels of the detector can be read. This modulation of the transmitted light may be of sufficiently high speed that the distance measurement can be performed with a predetermined accuracy, and that speed may be substantially higher than the rate at which the pixels of the detector can be read in parallel.

Yet other implementations may involve any of the methods described hereinabove, in which each segment of the acousto-optic modulator modulates received light containing information relating to a different point in the field of view. In such a case, light traversing each segment of the acousto-optic modulator should impinge onto an associated pixel in the pixelated detector.

Furthermore, any of such exemplary systems may further comprise a grey level detector, such that the system can combine an image of the field of view together with the distance information. Additionally, in any of the systems, the pixilated detector may advantageously be a line array.

Referring now to the temporal signature aspects of such methods, in any of the above described methods, the temporal signature arising from the distance of the point from the system should be a function of the transit time of the light to and from the point.

Furthermore, in such methods, the transmitted light may be amplitude modulated with a predetermined modulation frequency, in which case the temporal signature is the modulation phase delay of the received light relative to the transmitted light.

Alternatively, the transmitted light may be frequency chirped, in which case the temporal signature is the difference in frequency of the received light relative to the transmitted light.

In yet another example, the transmitted light may have a temporal coding scheme applied to it, and the temporal signature in this case is the temporal code of the received light relative to the transmitted light.

Additionally, alternative implementations of any of the above-described methods may further involve modulating light received from a field of view, the method comprising the steps of:
(i) launching a modulating acoustic wave down an acousto-optic modulator,
(ii) imaging separate segments of the acousto-optic modulator onto separate pixels of a pixelated line detector, each segment being associated with a separate pixel, and
(iii) reading information from each pixel independently,
wherein each segment of the acousto-optic modulator is modulated at a frequency substantially higher than the frequency at which the acoustic wave velocity of propagation down the modulator enables modulation of the complete length of the acousto-optic modulator.

In such a method, each segment may function as an independent acousto-optic modulator with its own detector pixel. Additionally, the rate of reading of information from the pixels in the line detector need not necessarily be limited by the acoustic wave velocity of propagation down the acousto-optic modulator.

Finally, although the implementations of the systems and methods of the present application have been generally described using acousto-optical modulation, it is to be understood that the systems and methods are intended to be operative with any other suitable modulation method, such as electro-optical modulation.

BRIEF DESCRIPTION OF THE DRAWINGS

The presently claimed invention will be understood and appreciated more fully from the following detailed description, taken in conjunction with the drawings in which:

DETAILED DESCRIPTION

In order to achieve high measurement accuracy, as explained in the Background section, a high modulation frequency is required, typically of the order of 100 MHz to 1 GHz for terrain mapping applications. Since frequencies of the order of hundreds of MHz are difficult to process for a detector array with a high pixel count, frequency conversion can be applied to the received optical wave in order to reduce the frequency and thus to improve the measurement simplicity. Frequency shift conversion can be used to reduce the processed frequencies by a factor of orders of magnitude, to a range easily handled, such as a few kHz or a few tens of kHz, yet without losing the resolution of the measurement. Since a scheme is used which maintains the phase information in the converted frequency, the measurement is much simpler, while the distance accuracy is maintained.

A common method of converting frequency by the several orders of magnitude required for this application, is by the process of frequency multiplication, which is a form of heterodyne mixing, and operates as follows:

The original reflected signal from the target has an intensity represented by $I_A \sin(\omega_1 t + \phi)$, where $\phi$ is the phase shift between the transmitted and the received wave resulting from the round-trip transit time to the measured target point, and is the object of the measurement.

This wave is multiplied by a second wave having intensity $I_B \sin \omega_2 t$, giving the resulting intensity:

$$I = I_0 + 0.5 I_A I_B \{ \cos[(\omega_1 - \omega_2)t + \phi)] - \cos[(\omega_1 + \omega_2)t + \phi] \}$$

In this result, there are two expressions:
(i) The first term having a frequency $(\omega_1 - \omega_2)$ and a phase term $\phi$, which is the signal of interest
(ii) The second term, having a frequency $(\omega_1 + \omega_2)$, which is a very high frequency term, beyond the response of the detector circuitry, and will thus not be detected.

If the frequency $\omega_2$ of the multiplying signal is chosen to be close to such that the difference $(\omega_1 - \omega_2)$ is small and appropriate to the desired low frequency sampling rate, it will be possible to handle the first term readily and speedily, and thus to determine the phase $\phi$ which is proportional to the distance to be measured.

Introducing some exemplary values to illustrate how this frequency conversion is used in the present system, if the modulation frequency of the transmitted, and therefore also the reflected wave is, for instance, 150 MHz, and the multiplying frequency is selected to be 150.010 MHz, the output frequencies after multiplication will be the sum frequency 300.010 MHz, which will is too high to be detected by the system, and the difference frequency of 10 kHz, which is readily handled by signal processing circuitry even for large pixel arrays.

Reference is now made to FIGS. 1A to 1D, which illustrate schematically how frequency multiplication achieves this aim.

Figure 1A:
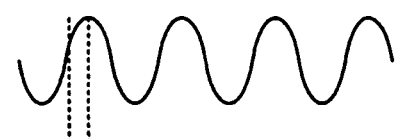
FIGS. 1A to 1D illustrate schematically frequency multiplication in order to generate a signal of lower frequency from a high frequency signal.

FIG. 1A, the top trace, shows the transmitted wave modulated at the original high frequency, such as 300 MHz, as in the example quoted above in the Background section to provide 1 cm distance resolution. The wave can be represented as $I_A \sin \omega_1 t$.

Figure 1B:
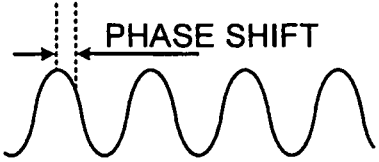

FIG. 1B shows the reflected wave received by a pixel of the detector array, with the wave phase shifted by an angle 4), this phase shift being the quantity to be measured to determine the range of the target item which reflected the wave. This wave can be represented as $I_A \sin(\omega_1 t + \phi)$. The intensity factor has been maintained as a normalized $I_A$ for use in the processing circuits, although in fact the optical intensity will have been considerably reduced.

Figure 1C:
Figure 1D:
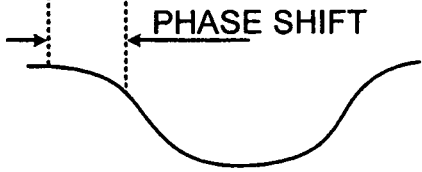

FIG. 1C now shows the effect of frequency conversion on the transmitted wave and FIG. 10 on the received wave. As is observed, the wave frequency is lower such that it can be more readily handled by the signal processing circuitry, and at the same time, the phase shift angle φ of the received wave relative to the reference transmitted wave has been maintained on an angular basis, such that it can be readily measured at the lower frequency. The reduction in frequency shown in FIGS. 1C and 1D has been displayed as substantially less than is used in practice. A reduction of orders of magnitude is generally practically required.

Returning now to the steps of frequency multiplication, this can be readily achieved by optical modulation, whereby the incoming wave is optically modulated in the receiver, before impinging on the light detector. The light output from such an optical modulator will be the multiplication of the input modulated light with the optical modulation frequency. A novel method of achieving such optical modulation is now discussed in more detail hereinbelow.

With conventional optical modulators, whether electro-optical or acousto-optical (AO), there are physical limitations which make this implementation impractical with currently available modulators operated in their conventional form. The problem arises because of the size of optical modulator required in order to cover a reasonable field of view with reasonable lateral resolution. Thus for an exemplary line image sensor having 2,000 pixels, each of which is 7×7 μm, the image sensor size becomes 14 mm×7 μm. However the bandwidth of an AO modulator of this length is much lower than the 300 MHz modulation range which is required for the distance resolution desired. This is because the speed of propagation of the acoustic wave in the modulator is typically on the order of up to 6,000 m/s, such that the time taken to "fill up" the crystal with the acoustic wave is much too long in comparison with the measurement periods required for the optical modulation frequencies to be processed. However, if a scheme can be devised whereby each small segment of the AO modulator is imaged by only a single pixel, then the bandwidth of each of these micro-segments becomes acceptable for the measurements to be performed. Each adjacent segment and its associated pixel will handle a different phase of the modulated signal, but since no correlation is required between adjacent image points, this is of no importance.

Expressed more mathematically, the size limitation in the use of AO modulators arises from application of the Lagrange Invariant principle applied to the terrain imaging problem on hand. According to this principle, the product of the beam size and the beam convergence is invariant. As an example, consider a terrain mapping application using an imaging beam emitted from the optical transmitter through a 50 mm aperture lens. A ground resolution of 1 cm. is required at a range of 200 m. Using a 4,000 pixel line array, that means that the line array will be able to cover a swath of terrain 40 m. in length. The field of view of the lens is thus 0.2 radian (40 m at 200 m range) The beam size×beam convergence product is thus 50 mm.×0.2 radians=10 mm.radians. Such a large value is generally regarded as being impossible to achieve with currently available modulators. For example, a currently available AO modulator of the order of 1 mm. long, has an acceptance angle of about 1 deg, i.e. 0.02 rad. The Lagrange product of this modulator is thus 0.02 mm.radians, which is a factor of approximately 500 less than what is required for the current terrain scanning application.

Figure 2:
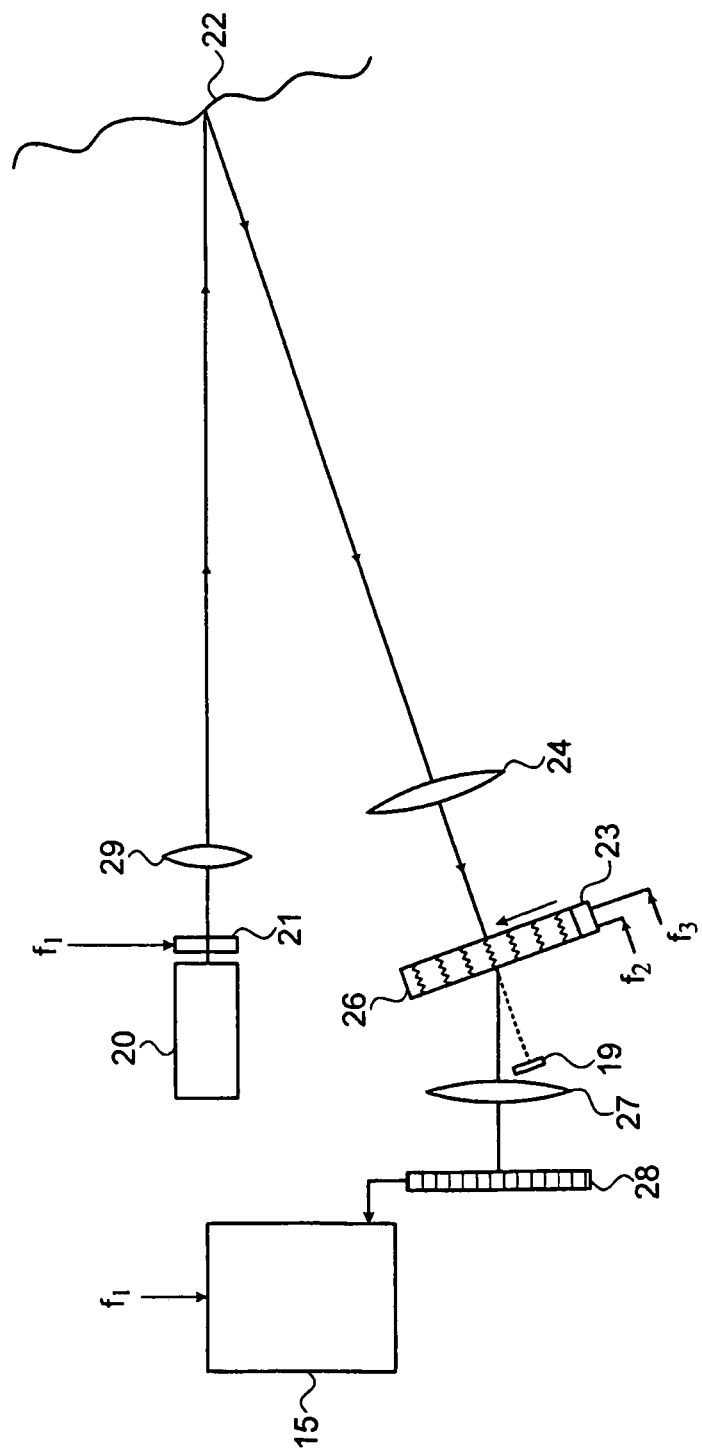
FIG. 2 illustrates schematically an acousto-optic modulator system configured for use in a terrain mapping application.

Reference is now made to FIG. 2 which illustrates schematically an exemplary distance measuring system, using an AO modulator configured to provide performance such that it can be used in the above described terrain mapping application. A light source such as a diode laser source 20, is modulated, either by means of its internal driver currents, or by means of an external electro-optical modulator 21, at a frequency $f_1$, sufficiently high that it can provide the accuracy required of the distance measurement. The essential feature is that the light received at the receiver be modulated at a sufficiently high frequency to enable the accuracy desired of the distance measurement to be achieved. The emitted light beam is collimated by the lens assembly 29, and is directed at the area to be mapped 22. Light is reflected from that area, and in FIG. 2, a region of the field of view is shown imaged by the objective lens 24 of the receiver onto an imaged plane in the AO modulator 26. An internal grating is set up in the AO modulator by the acoustic wave transmitted down the modulator, and the received light is diffracted by this grating onto a pixelated detector array 28 by means of a relay lens 27. The detector array may most conveniently be a line detector. The first order, rather than the zero diffraction order is most conveniently used, as it has a high output but without the appreciable DC component characteristic of the zero order mode, which is shown blocked 19 in the apparatus of FIG. 2. The signals read out from the pixels are input to a control system 15, which, using inputs of the phase of the transmitted beam modulated at frequency $f_1$, and that of the received light at each pixel, can determine the distance of the point in the field of view imaged by each pixel.

The operation of the interaction of the AO modulator with the pixelated detector array is now explained. Every segment of light destined for each pixel of the line detector passes through an associated segment of the crystal constituting the AO modulator. The AO modulator is driven by means of an ultrasonic transducer 23 located at an end, thereby sending an ultrasonic wave at a frequency $f_{AO}$ down the modulator crystal, which can typically be quartz, or any other suitable AO material. This ultrasonic wave sets up regions of local compression as it travels down the length of the crystal, thereby changing the refractive index at these local points of compression. As a result, a travelling grating is set up within the crystal, such that any light passing across the crystal undergoes modulation according to the local refractive index condition of the crystal. The AO modulator can also be used as a beam deflector using the grating set up within the crystal. However for this application, the beam modulating effect is used:

Reference is now made back to the geometry of the detection system of the terrain mapping application. A high-resolution line detector used for detecting the reflected signals may typically have 4,000 pixels, each of 7μ width. The length of this line detector will therefore be approximately 28 mm. If the detector is to accept a field of view of approximately 30°, as required by a typical terrain mapping application, the Lagrange invariant will be of the order of 14 mm.rad. Let us suppose that for the range accuracy required of the application, a modulation frequency of 150 MHz is required. In order to perform the frequency multiplication process mentioned above, and to obtain a pixel readout frequency of, for instance, 10 kHz, the AO modulator should be excited at 150.010 MHz, and the 150 MHz modulated wave reflected from the surveilled field passed though the AO modulator. Thus, the ON-OFF 150.010 MHz modulation of the AO modulator will generate the desired 10 kHz heterodyne signal for performing the phase measurements on each pixel, and therefore the range of the reflected light at each pixel.

However, there is one problem with this simplified description of the AO modulator operation of this system, and that is that the time taken for the exciting beam to pass from one end of the 28 mm crystal to the other is much longer than the ON-OFF time of a 150 MHz modulating signal. Thus, the modulator cannot completely turn an incident beam off until the exciting acoustic wave has passed right out of the crystal.

Inserting some numbers into the exemplary case illustrated here, if the AO modulator crystal is quartz, in which the velocity of the ultrasonic waves is approximately 6,000 m/s, it will take 4.6 µsec for the acoustic wave to clear the crystal from end to end. However, the period of a 150 MHZ optically modulated wave is 6 nsecs, which is almost 3 orders of magnitude shorter than the time taken for the crystal to fill or empty. That means that conventional AO modulator operation cannot be used to modulate a 150 MHz wave over the length of the crystal needed for the line detector used. Expressed differently, in order for the AO modulator to be able to completely switch ON or OFF a 150 MHz beam passing through it, the length of the AO modulator should be no more than the distance travelled by an acoustic wave travelling at 6,000 m/sec in a time of 3 nsecs, 3 nsecs being half of the period of a 150 MHz optical wave (only half the period to account for the ON-OFF time or vice versa). Calculation shows this length to be only 18 µm. Such a short AO modulator is orders of magnitude short of fulfilling the Lagrange invariant product mentioned above for this application. There thus exists the problem of how to switch a 28 mm. long AO modulator sufficiently quickly that it can perform 150 MHz modulation on the entire array of wavefronts reflected from the field being surveilled.

A solution to this problem can be proposed by observing that there is really no need for all of the segments of the long AO modulator to be modulated together in unison, i.e. that all be ON or that all be OFF at the same instant in time. All that is required is that each segment should be modulated at some point in time, and the phase shift be read from the pixel associated with that segment at that point in time, quite independently of when the adjacent pixels are read.

Figure 3A:
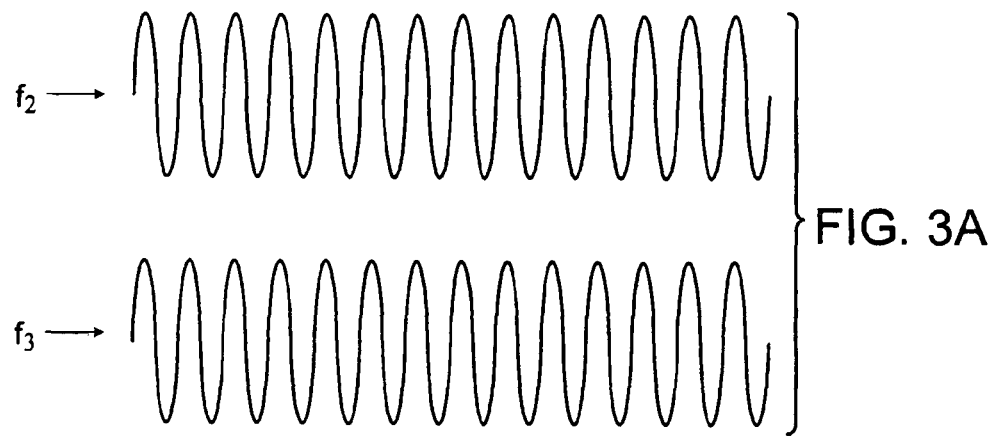
FIGS. 3A and 3B illustrate a novel implementation of the frequency excitation of an AO modulator to enable high accuracy real time three-dimensional mapping to be achieved, without departing from conventional detector array reading speeds.
Figure 3B:
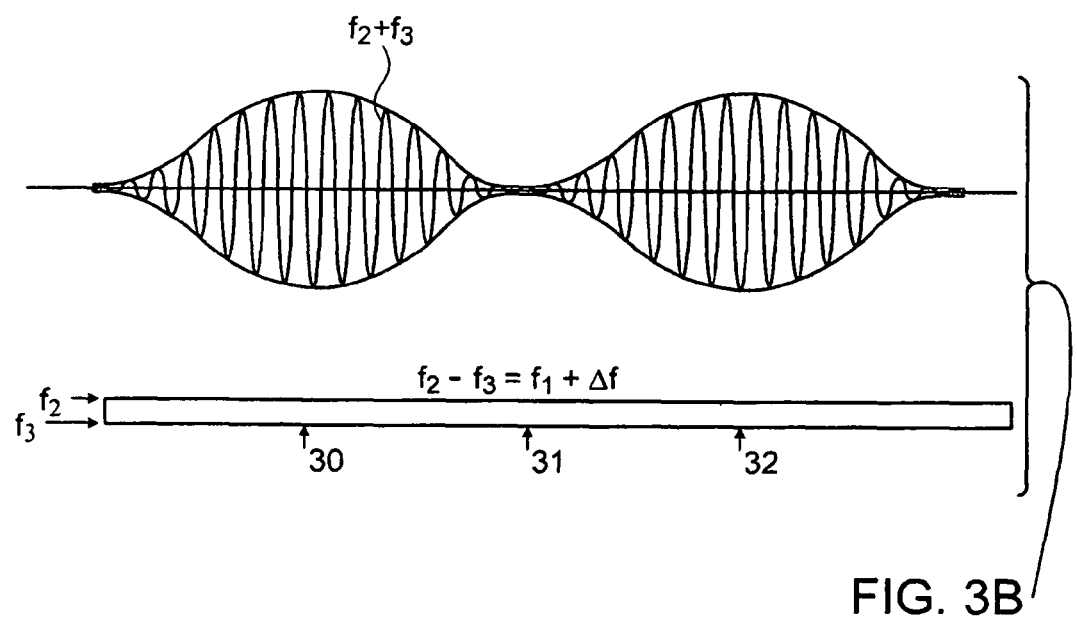

Reference is now made to FIGS. 3A and 3B, which illustrate a novel implementation of an AO modulator to enable this object to be achieved. Viewed from the aspect of an individual pixel of the line detector, the need is to modulate the light passing through the AO segment opposite that individual pixel at the desired 150 MHz rate. In other words, there is need to modulate the light at 150 MHz over no more than the length of each 7 µm pixel, so that the light entering each individual detector pixel is modulated at that frequency. At the same time, the limited velocity of the acoustic wave down the crystal length should not affect the ability to read essentially in parallel, the phase information from all of the pixels.

FIG. 3A shows a schematic time plot of the two frequencies $f_2$ and $f_3$, shown in FIG. 2 being input to the AO crystal 26. The interference between them will generate a travelling grating having a frequency equal to the sum and difference frequencies. Thus, for instance, if acoustic waves having frequencies of 425 MHz and 575 MHz are input into the AO modulator crystal of the present example, a travelling grating having an effective envelope frequency of 150 MHz is generated, which would pass down the crystal at the characteristic velocity of the acoustic wave. Such a grating would modulate the received 150 MHz light passing through it, but would not generate any of the desired frequency conversion. It should be noted in passing that it is necessary to use the interference between two acoustic waves to generate the grating that can modulate the amplitude of light traversing the crystal, since exciting the AO crystal with a single acoustic wave will result only in the generation of a travelling phase grating, which will not modulate the amplitude of the traversing light. Only the mixing interference between two input waves will generate an amplitude grating.

If however, the two acoustic frequencies $f_2$ and $f_3$ are selected to have a difference between them slightly different from 150 MHz, the situation is completely changed. FIG. 3B shows the effect of inputting acoustic waves of frequencies, for instance, 424.995 and 575.005 MHz, whose interference results in a 150.010 MHz acoustic wave travelling down the crystal. When this now interacts with the traversing modulated light at 150 MHz, the result is the sum interference base frequency of 1 GHz for diffracting the incident light, as shown within the waveforms in FIG. 3B, but with a 150.010 MHz modulation envelope applied to it. This grating moves down the crystal at the characteristic velocity of the acoustic wave, generating frequency down-conversion to the light passing through and being diffracted by the acoustic wave within the envelope. Looking now at any point along the crystal, the result is that the 150.010 MHz AO modulation is no longer constant, but fluctuates at the 10 kHz rate with passage of the modulation envelope down the crystal length. Thus, at point 30, the interference grid has a maximum value, and will generate an efficient frequency conversion of the incident modulated light, while at point 31 at the same point in time, there is essentially no interference grid, and there is thus no output at that point in time, and at point 32, the output is again optimum. Thus the interference between the acoustic wave frequency at a frequency slightly shifted from the optical modulation frequency, and the optical modulation frequency itself results in a low frequency modulation, which is the converted frequency, which contains the phase information of the modulated light received from the target. Thus, each pixel sees the modulated light reflected from the field, further modulated by the travelling modulated grid running down the AO modulator at 6,000 m/s, and resulting in a 10 kHz effective reading rate at each pixel. Every pixel then sees the reflected light impinging on it at an effective frequency of 10 kHz, with the phase information relevant to the distance measured being impressed on the 10 kHz waveform, as shown schematically in FIGS. 1C and 1D hereinabove.

Thus, each pixel can be read at a manageable addressing rate, 10 kHz in the example quoted, but can deduce phase information from the incoming light modulated at 150 MHz, such that a high resolution, of the order of centimeters, can be obtained for the distance measurement. This implementation thus constructs a linear array of micro-AO modulators, each a few microns long and thus capable of being switched at the desired 150 MHz rate, but connected in a serial arrangement such that their effective total length is some tens of mm, as required by a ranging application which will be able to cover a useful field of view.

Because of the cyclic nature of phase difference measurements, it may be preferable, in order to increase the dynamic range of the measurements, to use more than one modulating frequency, with the low frequencies being used for low-resolution measurements and higher frequencies for high resolution measurements. Thus for example, if it is necessary to measure the distance at a range of 150 m with an accuracy of 1.5 cm, one option is to use a modulating frequency of 1 MHz and a very high resolution measurement to provide the desired accuracy. However such a high resolution measurement is difficult to perform. An alternative option is to use the same 1 MHz frequency in order to find the distance to within an accuracy of 1 m, using a low-resolution measurement and then to switch to a 100 MHz frequency, which will have a 1.5 m wavelength, and to achieve the measurement accuracy of 1.5 cm but with phase ambiguity repeating every 1.5 m.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

I claim:

1. A system for remote distance measurement, comprising:
a light source assembly configured to transmit modulated light to a point whose distance is to be measured in the field of view of said system;
a pixelated detector, adapted to receive light reflected from said point and imaged onto a pixel of said detector; said received light having a temporal signature arising from the distance of said point from said system;
an acousto-optic modulator, disposed relative to said pixelated detector, such that said received reflected light passes therethrough before impinging on said pixelated detector; and
a control system adapted to calculate said distance of said point from the temporal signature of said received light,
wherein said acousto-optic modulator is excited with a travelling modulating acoustic wave generated from a pair of acoustic waves having a difference in waveform which mix acoustically in said acousto-optic modulator, such that passage of modulated light received from said point through said acousto-optic modulator, generates a converted modulated optical wave containing said temporal signature information in a frequency range substantially less than that related to said modulation of said transmitted light.

2. A system according to claim 1, wherein said frequency range substantially less than that of said modulation of said transmitted light falls within the rate at which the pixels of said detector can be read.

3. A system according to claim 1, wherein said modulation of said transmitted light is of sufficiently high speed that said distance measurement can be performed with a predetermined accuracy.

4. A system according to claim 3 wherein said modulation speed is substantially higher than said rate at which the pixels of said detector can be read in parallel.

5. A system according to claim 1, wherein each segment of said acousto-optic modulator is configured to modulate received light containing information relating to a different point in said field of view.

6. A system according to claim 1, wherein light traversing each segment of said acousto-optic modulator impinges onto an associated pixel in said pixelated detector.

7. A system according to claim 1, further comprising a grey level detector, such that said system can combine an image of said field of view together with said distance information.

8. A system according to claim 1, wherein said transmitted light is amplitude modulated with a predetermined modulation frequency, and said temporal signature is the modulation phase delay of said received light relative to said transmitted light.

9. A system according to claim 1, wherein said transmitted light is frequency chirped, and said temporal signature is the frequency of said received light relative to said transmitted light.

10. A system according to claim 1, wherein said transmitted light has a temporal coding scheme applied to it, and said temporal signature is the temporal code of said received light relative to said transmitted light.

11. A method for remote distance measurement, comprising the steps of:

transmitting modulated light to a point whose distance is to be measured;
providing a pixelated detector, positioned such that light reflected from said point is imaged onto a pixel of said detector, said received light having a temporal signature by virtue of the distance of said point;
providing an acousto-optic modulator disposed relative to said pixelated detector, such that said received reflected light passes therethrough before impinging on said pixelated detector;
exciting said acousto-optic modulator with a travelling modulating acoustic wave generated by inputting a pair of acoustic waves having a difference in waveform which mix acoustically in said acousto-optic modulator, such that when modulated light received from said point is passed through said acousto-optic modulator, a converted modulated optical wave is generated containing said temporal signature information in a frequency range substantially less than that related to said modulation of said transmitted light; and
calculating said distance of said point from the temporal signature of said received light.

12. A method according to claim 11 wherein said pixelated detector measures the temporal signature of phase difference between light transmitted to said remote line and light received from said point with an accuracy characteristic of said modulation frequency, and at a rate characteristic of said frequency range substantially less than that related to said modulation of said transmitted light.

13. A method according to claim 11, wherein said frequency range substantially less than that related to said modulation of said transmitted light falls within the rate at which the pixels of said detector can be read.

14. A method according to claim 11, wherein said modulation of said transmitted light is of sufficiently high speed that said distance measurement can be performed with a predetermined accuracy.

15. A method according to claim 14 wherein said modulation speed is substantially higher than said rate at which the pixels of said detector can be read in parallel.

16. A method according to claim 11, wherein each segment of said acousto-optic modulator modulates received light containing information relating to a different point in said field of view.

17. A method according to claim 11, wherein light traversing each segment of said acousto-optic modulator impinges onto an associated pixel in said pixelated detector.

18. A method according to claim 11, further comprising the step of detecting the grey level at each pixel, such that said system can combine an image of said points whose distance is measured together with said distance information.

19. A method according to claim 11, wherein said transmitted light is amplitude modulated with a predetermined modulation frequency, and said temporal signature is the modulation phase delay of said received light relative to said transmitted light.

20. A method according to claim 11, wherein said transmitted light is frequency chirped, and said temporal signature is the frequency of said received light relative to said transmitted light.

21. A method according to claim 11, wherein said transmitted light has a temporal coding scheme applied to it, and said temporal signature is the temporal code of said received light relative to said transmitted light.

* * * * *